No. 718,463. PATENTED JAN. 13, 1903.
H. L. JACKSON.
LIFTING RAILS FOR SELF DUMPING CAGES.
APPLICATION FILED MAY 3, 1902.
NO MODEL.
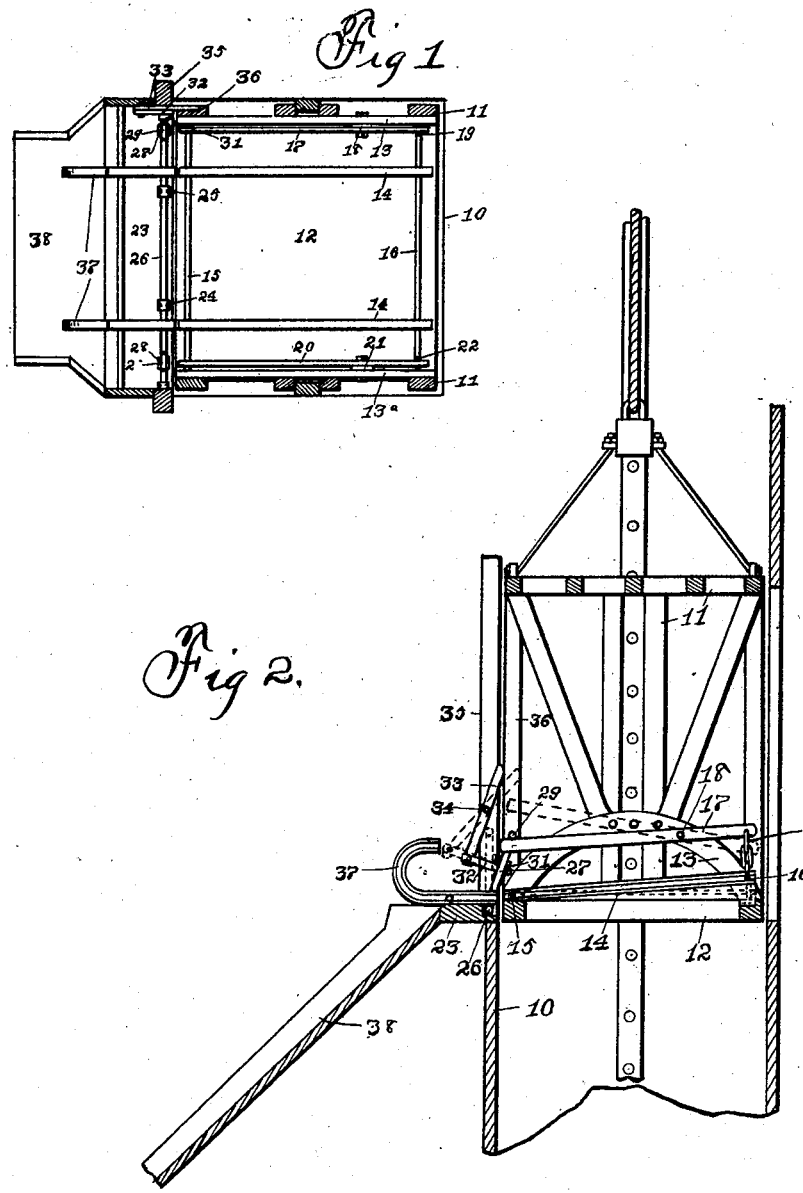

UNITED STATES PATENT OFFICE.

HIRAM L. JACKSON, OF DES MOINES, IOWA.

LIFTING RAILS FOR SELF-DUMPING CAGES.

SPECIFICATION forming part of Letters Patent No. 718,463, dated January 13, 1903.

Application filed May 3, 1902. Serial No. 105,749. (No model.)

*To all whom it may concern:*

Be it known that I, HIRAM L. JACKSON, a citizen of the United States, residing at Des Moines, in the county of Polk and State of Iowa, have invented a new and useful Improvement in Lifting Rails for Self-Dumping Cages, of which the following is a specification.

The object of my invention is to provide a simple, durable, and inexpensive means of automatically lifting the rear ends of the rails in a cage when the cage has reached the elevation of the tipple for the purpose of running the car onto the tipple.

My invention consists of certain details of construction hereinafter set forth, pointed out in my claim, and illustrated in the accompanying drawings, in which—

Figure 1 shows a plan view of the cage-floor and tipple fitted out with my improved rail-lifting device; and Fig. 2 shows in section the shaft, cage, tipple, and chute, the various parts of my improved rail-lifting device being shown in the position they assume when the cage has reached the elevation of the tipple, the dotted lines indicating the position of the parts before the cage has reached the top of the shaft.

Referring to the accompanying drawings, the reference-numeral 10 is used to indicate a coal-shaft in which is operated a cage 11.

The numeral 12 indicates the floor of the cage, and 13 and 13ª the side braces.

The numeral 14 indicates the rails on which the coal-car is designed to rest, secured at their forward ends to a loose shaft 15, having its bearings in the side braces 13 and 13ª, and secured at their rear ends to a shaft 16, which terminates on each side before reaching the side braces 13 and 13ª of the cage 11. These two shafts 15 and 16 constitute the only fastenings in securing the rails 14 to each other and to the cage 11. Thus it may be seen that the rear of the rails 14 are permitted an upward swing from the shaft 15 when the proper pressure is applied.

The numeral 17 indicates a lever placed along the inner side of the framework of the cage and a short distance above the floor, extending the entire length of the floor and fulcrumed at 18 on the side brace 13. To the rear end of the lever 17 is secured a chain 19, extending downwardly and connected at its other end to the shaft 16. On the opposite inner side of the cage 11 is a lever 20, fulcrumed at 21 in the side brace 13ª and having a chain 22, connecting the rear end of the lever to the shaft 16, said lever being exactly similar to the lever 17 and designed to operate in unison with it.

The numeral 23 indicates the floor of the tower at the top of the coal-shaft 10. Secured in the forward edge of the floor 23, by means of the metal straps 24 and 25, is a loose shaft 26, extending the entire length of the coal-shaft 10.

The numerals 27 and 28 indicate arms affixed to and extending upwardly from the shaft 26, said arms having at their forward ends inwardly-projecting elbows 29 and 30, respectively. These arms are so arranged on the shaft 26 that their elbows 29 and 30 are in line with the levers 17 and 20 in the cage 11. These arms are also designed to be shorter than the distance from the forward ends of the levers 17 and 20 in the cage 11 to the cage-floor 12.

The numeral 31 indicates another arm extending upwardly from and affixed to one end of the shaft 26, said arm having attached to its forward end a backwardly-extending rod 32, the other end of which is attached to a lever 33, fulcrumed at 34 to a beam 35 in the side of the coal-shaft 10. This lever 33 rests in an inclined plane, the upper end extending into the coal-shaft 10, and is designed to be in line with an upright beam 36 in the forward face of the cage 11. The numeral 37 indicates the tipple, and the numeral 38 the chute.

It is obvious that as a cage approaches the elevation of the tipple the beam 36 will engage the lever 33, forcing it back, thus moving forward the arm 31 and causing the loose shaft 26 to revolve for a limited distance in a forwardly direction, thus throwing the arms 27 and 28 into the cage 11. The elbows 29 and 30 being in line with the levers 17 and 20 will engage said levers and hold them rigid as the cage continues to ascend to the elevation of the tipple. As the forward ends of the levers 17 and 20 are held by the elbows 29 and 30 and the cage continues to ascend, the outer ends of said levers will move upward from the fulcrums 18 and 21 and cause the rear ends of the rails to be lifted from the floor 12, thus causing said rails to assume a forwardly-inclined plane, from which the coal-car will run onto the tipple.

Having thus described my invention, what I claim, and desire to secure by Letters Patent of the United States, is—

A rail-lifting device for cages operated in coal-shafts, comprising in combination two parallel rails 14 on the cage-floor 12, secured near their forward ends to a loose shaft 15 having its bearings in the side braces of the cage 13 and 13ª, and secured at their rear ends to a shaft 16; two levers, 17 and 20, arranged one on each inner lengthwise side and a short distance above the floor of the cage 11, said levers extending the full length of the cage and attached at their rear ends, by means of chains 19 and 22, to a shaft 16; a loose shaft 26 secured in the forward edge of the floor 23, of the tower, said shaft extending the entire width of the coal-shaft 10; two arms 27 and 28 mounted rigidly upon, and extending upwardly from, the shaft 26, having at their forward ends inwardly-projecting elbows 29 and 30, designed to engage the levers 17 and 20, as the floor 12, of the cage 11, nears the elevation of the tipple 37; an arm 31 mounted rigidly upon, and extending upwardly from, one end of the shaft 26, having attached to its forward end a backwardly-extending rod 32 connected at its other end with a lever 33, fulcrumed in the side of the coal-shaft 10, said lever projecting on an inclined plane into the coal-shaft and designed to be engaged by an upright beam in the forward face of the cage 11, as the cage nears the top of the shaft, substantially as and for the purposes stated.

H. L. JACKSON.

Witnesses:
ADDIE JACKSON,
F. S. ROE.